United States Patent
Shibagaki et al.

(10) Patent No.: US 7,764,037 B2
(45) Date of Patent: Jul. 27, 2010

(54) ELECTRONIC APPARATUS AND METHOD OF CONTROLLING ELECTRIC MOTOR MOUNTED IN ELECTRONIC APPARATUS

(75) Inventors: Yasutaka Shibagaki, Matsumoto (JP); Tomoyoshi Kakegawa, Matsumoto (JP); Toshihiko Katayama, Higashichikuma-gun (JP)

(73) Assignee: Seiko Epson Corporation, Tokyo (JP)

( * ) Notice: Subject to any disclaimer, the term of this patent is extended or adjusted under 35 U.S.C. 154(b) by 328 days.

(21) Appl. No.: 12/039,273

(22) Filed: Feb. 28, 2008

(65) Prior Publication Data
US 2008/0211443 A1 Sep. 4, 2008

(30) Foreign Application Priority Data
Mar. 2, 2007 (JP) ............................. 2007-052827

(51) Int. Cl.
G05D 23/00 (2006.01)
(52) U.S. Cl. .................... 318/471; 318/445; 318/484
(58) Field of Classification Search ............ 318/445, 318/471, 484
See application file for complete search history.

(56) References Cited

U.S. PATENT DOCUMENTS 4,524,368 A * 6/1985 Inui et al. ................ 347/196
5,073,861 A * 12/1991 Itoh et al. ................ 702/132
5,184,150 A * 2/1993 Sugimoto ................ 347/196

FOREIGN PATENT DOCUMENTS

JP 2003-079187 3/2003

* cited by examiner

*Primary Examiner*—Bentsu Ro
*Assistant Examiner*—David S Luo
(74) *Attorney, Agent, or Firm*—Workman Nydegger

(57) ABSTRACT

An electronic apparatus includes: a timer member that clocks time on the basis of the power supplied from a power source. A power supply member supplies the power to an electric motor of the electronic apparatus and to the timer member from the power source and interrupts the power supply thereto. A heat storage calculating member calculates heat storage of the electric motor and calculates heat storage of the electric motor after stop of the drive on the basis of the time clocked by the timer member. A controller controls the electric motor and controls the power supply member by initiating power-on and power-off operations. This is performed so as to, maintain the power supply to the timer member and the heat storage calculating member during a predetermined time, even after the power-off operation of the operation member.

8 Claims, 10 Drawing Sheets

| DRIVE SPEED | DRIVE TIME | | | |
|---|---|---|---|---|
| | ST0 | ST1 | ··· | STm |
| V0 | GQ00 | GQ01 | ··· | GQ0m |
| V1 | GQ10 | GQ11 | ··· | GQ1m |
| V2 | GQ20 | GQ21 | ··· | GQ2m |
| ⋮ | ⋮ | ⋮ | ··· | ⋮ |
| Vn | GQn0 | GQn1 | ··· | GQnm |

ELECTRONIC APPARATUS AND METHOD OF CONTROLLING ELECTRIC MOTOR MOUNTED IN ELECTRONIC APPARATUS

BACKGROUND

1. Technical Field

The present invention relates to an electronic apparatus mounted with an electric motor and a method of controlling the electric motor mounted in the electronic apparatus.

2. Related Art

Generally, as an electronic apparatus mounted with an electric motor, a printing apparatus (which is also called "an ink jet printer") which performs printing by ejecting ink on a printing medium (for example, a paper sheet) fed therein is known. Such a printing apparatus is provided with a motor (so-called sheet-feeding motor) for feeding the printing medium thereto, a motor (so-called carriage motor) for moving a printing head for ejecting ink, and the like. When these motors are intermittently driven, an amount of emitted heat becomes larger than an amount of discharged heat. Therefore, these motors may become overheated. Accordingly, such a printing apparatus is configured to perform emission heat controlling of controlling an amount of heat emitted by the respective motors if the amount of emitted heat calculated on the basis of a drive type of the respective motors exceeds a preset heat storage threshold value.

However, if power supply to the printing apparatus is interrupted from a power source (hereinafter, referred to as "a power-off state"), heat stored in the respective motors is gradually discharged. Therefore, in a case where the power-off state is relatively long (for example, the power-off state continues for one day or more), the heat of the respective motors is sufficiently discharged. Accordingly, when drive of the printing apparatus resumes, the heat storage of the respective motors becomes nearly zero. On the other hand, in a case where the power-off state is relatively short (for example, the power-off state continues for about 5 minutes), the heat of the respective motors is not sufficiently discharged. Accordingly, when the drive of the printing apparatus resumes, there is a possibility that the heat is still stored in the respective motors.

In order to solve such a problem, in the printing apparatus, when a user operates a power switch (operation unit) to turn the power source off, the heat storage of the respective motors at the power-off time is stored in a nonvolatile memory as an operating heat storage, and then the power source becomes turned off. Afterward, when the user operates the power switch again to use the printing apparatus (that is, to turn the power source on), the operating heat storage read from the nonvolatile memory is set to a reference heat storage (an initial value). On the basis of the reference heat storage, heat storage of the respective motors at the time of resuming the drive of the printing apparatus is calculated (for example, see JP-A-2003-79187).

Accordingly, if the power source is turned on in a state where a period of time (referred to as an interrupt period of time) after the power-off until the power-on is relatively short (for example, the interrupt period of time is about 5 minutes), operating heat storage read from the nonvolatile memory is just slightly much than actual heat storage (hereinafter, referred to as "actual heat storage") of the respective motors immediately after the power source is turned on. Therefore, in the printing apparatus disclosed in JP-A-2003-79187, the emission heat controlling is performed when the actual heat storage generated by the drive of the respective motors is equal to or larger than the heat storage threshold value in a case where the interrupt period of time is short.

However, in the printing apparatus disclosed in JP-A-2003-79187, as the interrupt period of time is longer, the reference heat storage (=operating heat storage) of the respective motors at the time of turning the power source on becomes considerably different from the actual heat storage of the respective motors. Therefore, in a case where the interrupt period of time is relatively longer, the calculated heat storage of the respective motors exceeds the heat storage threshold value even though the actual heat storage of the respective motors does not yet exceed the heat storage threshold value. For this reason, the emission heat controlling may be performed at erroneous time. In this case, the performance of the emission heat controlling may result in printing start failure or slow printing speed, contrary to a user desire to perform speed printing.

In a printing apparatus mounted with a RTC (Real Time Clock) for clocking time even in the power-off state by feeding a power source from a battery or the like provided therein, the interrupt period of time is exactly calculated. Accordingly, it is possible to exactly calculate the amount of discharged heat of the respective motors during the interrupt period of time. However, if the printing apparatus is provided with the RTC, an element of the printing apparatus has to be added, thereby increasing manufacturing cost.

SUMMARY

An advantage of some aspects of the invention is that it provides an electronic apparatus capable of exactly setting an initial value for heat storage of an electric motor when power supply from a power source starts, and a method of controlling the electric motor mounted in the electronic apparatus.

According to an aspect of the invention, there is provided an electronic apparatus including: an electric motor; an operation member that performs a power-off operation of interrupting power supply from a power source and a power-on operation of starting the power supply; a timer member that clocks time on the basis of the power supplied from the power source; a power supply member that supplies the power to the electric motor and the timer member from the power source and interrupts the power supply thereto; a heat storage calculating member that calculates heat storage of the electric motor during drive of the electric motor and calculates heat storage of the electric motor after stop of the drive on the basis of the time clocked by the timer member; and a controller that controls the electric motor and controls the power supply member so as to start the power supply on the basis of the power-on operation of the operation member and interrupt the power supply on the basis of the power-off operation of the operation member. In the electronic apparatus, the controller controls the power supply member so as to maintain the power supply to at least the timer member of the timer member and the heat storage calculating member during a predetermined time even after the power-off operation of the operation member, and the heat storage calculating member has an initial value setting portion that sets the heat storage on the basis of time clocked by the timer member after the power-off operation as an initial value of the heat storage of the electric motor in the next power-on operation of the operation member.

According to the electronic apparatus having the above-described configuration, the power is supplied from the power source until a predetermined time passes after the power-off operation, even though the power-off operation of the operation member is performed. Accordingly, the clocking of the timer member continues. The heat storage of the electric motor at the time of actually interrupting the power supply is calculated on the basis of the time clocked by the timer member after the power-off operation of the operation member is performed until the power supply is actually interrupted. In addition, the heat storage is set as an initial value for the heat storage of the electric motor in the next power-on operation of the operation member. Accordingly, when the power-on operation of the operation member is actually performed, the heat storage of the electric motor is calculated on the basis of the set initial value. Therefore, it is possible to exactly set the initial value of the heat storage of the electric motor at the time of starting the power supply from the power source, comparing to a known example in which heat storage of the electric motor right after the power-off operation of the operation member is set as reference heat storage.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, an electronic apparatus and a method of controlling an electric motor mounted in the electronic apparatus according to a first embodiment of the invention will be described with reference to FIGS. 1 to 8. In the following embodiments, "front and rear directions", "right and left directions", and "upper and lower directions" refer to front and rear directions (sub-scanning direction), right and left directions (main scanning direction), and upper and lower directions indicated by arrows of FIG. 1.

Figure 1:
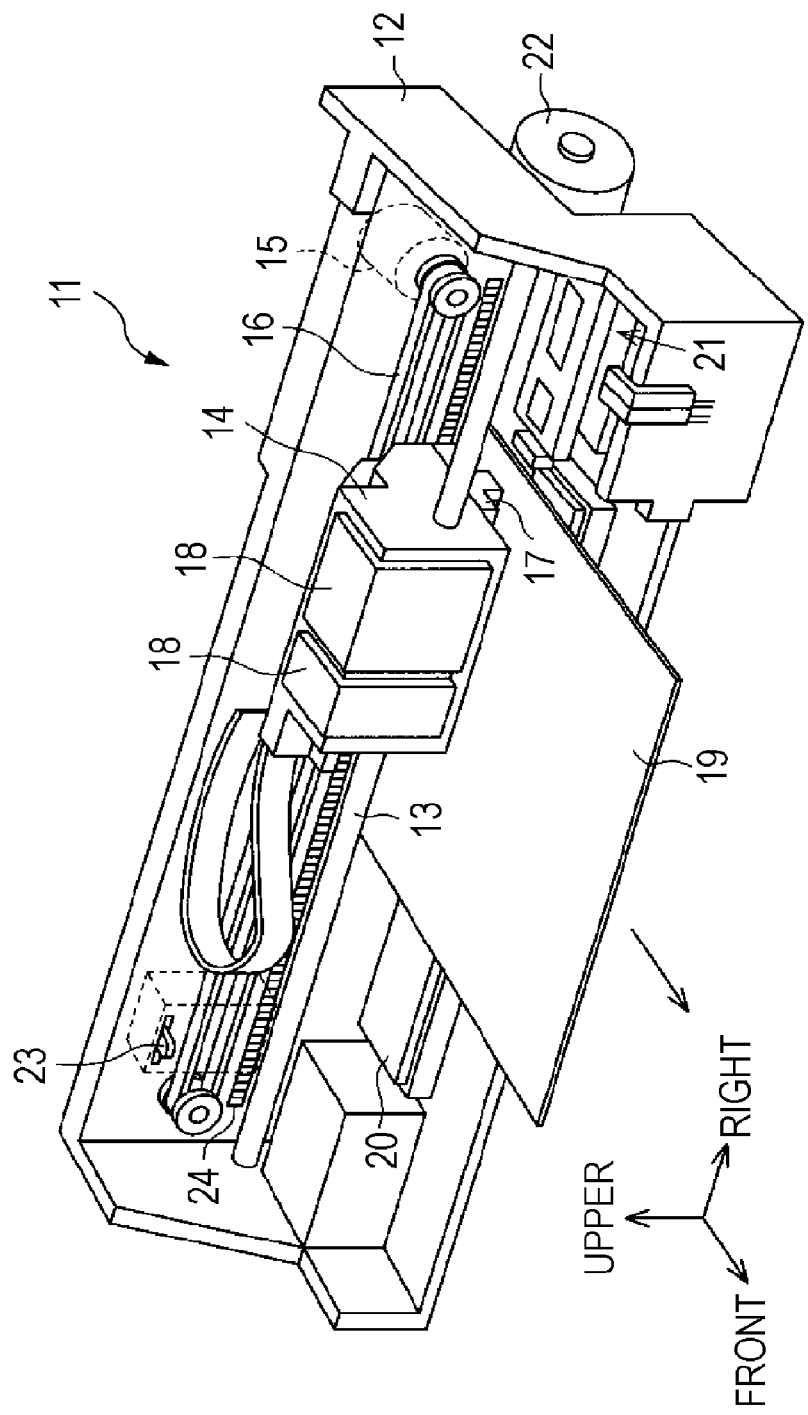
FIG. 1 is a schematic perspective view illustrating a printing apparatus according to a first embodiment.

As shown in FIG. 1, a printing apparatus 11 as an electronic apparatus is an ink jet printer and has a body case 12 which is formed in a rectangular shape in plan view. In the body case 12, a carriage 14 which is guided to a guide shaft 13 and reciprocates in the right and left directions is provided. The carriage 14 is fixed to a part of an endless timing belt 16 which is rotatably driven by a carriage motor 15 (hereinafter, referred to as "a CR motor") as an electric motor. In addition, the carriage 14 is configured to reciprocate in the right and left directions by the forward and reverse drive of the CR motor 15.

An ink jet printing head 17 is disposed below the carriage 14. In addition, ink cartridges 18 for supplying ink to the printing head 17 are detachably mounted in an upper portion of the carriage 14. A nozzle forming surface having a plurality of open nozzles (not shown) is formed on the lower surface of the printing head 17. The printing head 17 ejects ink drops onto a paper sheet 19 as a printing medium through the nozzles by drive of piezoelectric vibrators which each correspond to each of the nozzles (not shown).

Below the carriage 14, a platen 20 which regulates a gap between the printing head 17 and the paper sheet 19 is disposed so that the lengthwise direction thereof accords with a direction of the guide shaft 13. A right end position outside a printable area in which printing (ejecting of ink drops) can be performed within a movement range in the right and left directions of the carriage 14 is configured to be a home position of the carriage 14. Moreover, a maintenance unit 21 for performing a maintenance process (for example, cleaning) of the printing head 17 is disposed at a position corresponding to the home position.

A paper-sheet feeding motor 22 (hereinafter, referred to as "a PF motor") as an electric motor is disposed in a rear lower portion of the body case 12. A trigger lever 23 protrudes from an opening of a rear surface of the body case 12 at the left end position outside the printable area within the movement range in the right and left directions of the carriage 14 and opposite the home position, and is disposed at a position where the trigger lever 23 is engaged with the carriage 14. In a case where the trigger lever 23 is pressed by the carriage 14 which is moved in the left direction on the basis of drive of the CR motor 15, a driving force of the PF motor 22 can be delivered to a paper-sheet feeding mechanism. At this time, when the PF motor 22 is driven, the paper-sheet feeding mechanism is driven, and the paper sheet 19 is then fed to the body case 12.

In course of feeding of the paper sheet, the paper sheet 19 is transported (fed) in the front direction by the drive of the PF motor 22 (that is, the paper-sheet feeding mechanism). The printing on the paper sheet 19 is performed by alternatively performing the printing while ejecting the ink drops from the printing head 17 during the movement of the carriage 14 in the left direction and performing the feeding of the paper sheet 19 in the front direction. In addition, in the body case 12, a linear encoder 24 is disposed along the guide shaft 13. The linear encoder 24 outputs the number of pulses proportional to a movement distance of the carriage 14. Moreover, based on a movement location, a movement speed, and a movement direction of the carriage 14 grasped by detecting the output pulses, speed control and location control of the carriage 14 are performed.

Next, an electrical configuration of the printing apparatus 11 according to the embodiment will be described with reference to FIG. 2.

Figure 2:
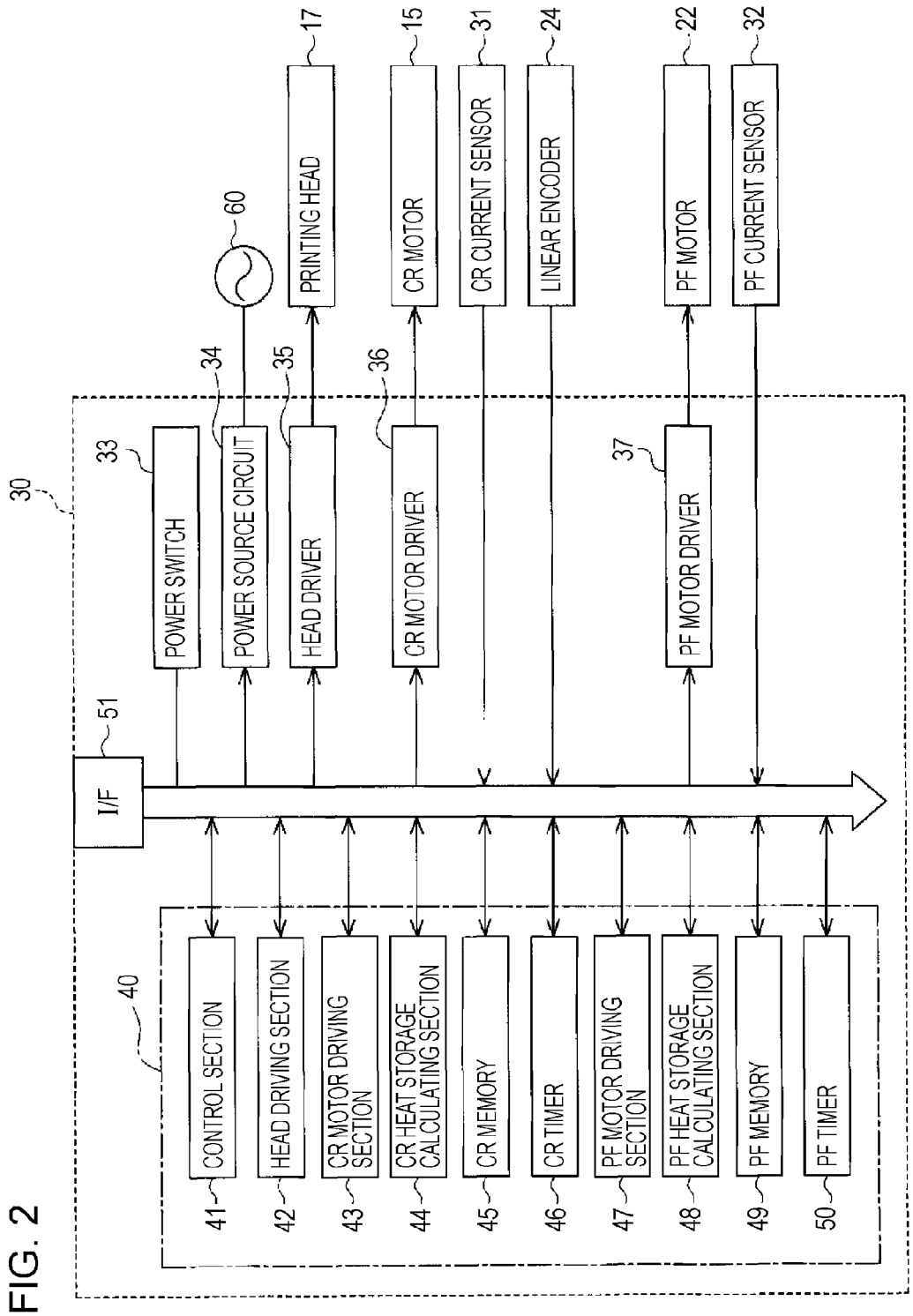
FIG. 2 is a block diagram illustrating an electrical configuration of a circuit according to the first embodiment.

As shown in FIG. 2, the printing apparatus 11 includes a controller 30 which performs various processes of the printing apparatus 11. A CR current sensor 31 for detecting a magnitude of current (hereinafter, referred to as "a current value") which has been supplied to the CR motor 15, a PF current sensor 32 for detecting the current value which has been supplied to the PF motor 22, and the like are electrically connected in an input-side interface (not shown) of the controller 30. The printing head 17, the CR motor 15, the PF motor 22, and the like are electrically connected in an output-side interface (not shown) of the controller 30. Moreover, the controller 30 is configured to individually control drive of the printing head 17, the CR motor 15, and the PF motor 22.

The controller 30 includes a power switch 33 as an operation unit operated by a user when power supply from an AC (alternating-current) source 60 is started or the power supply from the AC source 60 is interrupted. The controller 30 also includes a power source circuit 34 electrically connected to the AC source 60 through a power code or the like. In addition, the controller 30 includes a head driver 35 for controlling drive of the printing head 17, a CR motor driver 36 for controlling drive of the CR motor 15, a PF motor driver 37 for controlling drive of the PF motor 22, and a control unit 40 (which is indicated by a dashed line in FIG. 2) formed of a digital computer and the like. The power source circuit 34 converts an alternating voltage (for example, 100 V) input from the AC source 60 into a predetermined direct voltage to individually supply the direct voltage to the drivers 35, 36, and 37 and the control unit 40. For example, the power source circuit 34 supplies a controlling direct voltage (for example, from 3 V to 6 V) to the control unit 40. In addition, the power source circuit 34 also supplies a direct voltage (for example, about from 30 V to 50 V) for motor drive to the motor drivers 36 and 37 for driving the CR motor 15 and the PF motor 22.

The control unit 40 includes a CPU, a ROM, a RAM, an ASIC (Application Specific Integrated Circuit), and a non-volatile memory (for example, EEPROM). In addition, the control unit 40, which is a unit performed by at least one of a hardware and software, includes a control section 41, a head driving section 42, a CR motor driving section 43, a CR heat storage calculating section 44, a CR memory 45, a CR timer 46, a PF motor driving section 47, a PF heat storage calculating section 48, a PF memory 49, and a PF timer 50.

The control section 41 is constituted by the CPU and the ASIC. When receiving printing data (bitmap data) from a host computer (not shown) through an interface 51, the control section 41 transmits the printing data to the head driving section 42, and also outputs a control command for driving the motors 15 and 22 to the motor driving units 43 and 47, respectively. In addition, the control section 41 controls drive of the power source circuit 34 to start power supply, when a signal is input from the power switch 33 in a case where the power supply from the AC source 60 to the control unit 40 or each of the drivers 35, 36, and 37 is interrupted. On the other hand, the control section 41 controls the drive of the power source circuit 34 to interrupt the power supply after finishing a subsequent power-off operation described below, when a signal from the power switch 33 is input during the power supply from the power source circuit 34. Accordingly, in the embodiment, the control section 41 is formed of a control member. In addition, the power source circuit 34 and the control section 41 constitute a power supply member. In the following description, interrupting the power supply from the AC source 60 to the control unit 40 or each of the drivers 35, 36, and 37 refers to "a power-off operation". Moreover, performing the power supply from AC source 60 to the control unit 40 or each of the drivers 35, 36, and 37 refers to "a power-on operation.

The head driving section 42 controls ejection of ink drops through the nozzles on the basis of the printing data (bitmap data) transmitted from the control section 41.

The motor driving units 43 and 47, which are each formed of a CPU, control drive (that is, a rotation direction, a drive speed, or the like) of the motors 15 and 22 through the motor drivers 36 and 37 on the basis of the control command of the control section 41. The CR motor driving section 43 detects the drive speed (rotation speed) of the CR motor 15 on the basis of a movement speed of the carriage 14 detected by inputting an output pulse output from the linear encoder 24, when driving the CR motor 15. Subsequently, the CR motor driving section 43 transmits information about the detected drive speed of the CR motor 15 to the CR heat storage calculating section 44. In addition, when stopping the drive of the CR motor 15 which is being driven, the CR motor driving section 43 reads the stop time (hereinafter, referred to as "stop time") from the CR timer 46 and transmits the information about the stop time to the control section 41. In the following description, a series of operations of the carriage 14 which is moved in the left direction from the home position and returned to the home position again is referred to as "a printing process".

The PF motor driving section 47 transmits to the PF heat storage calculating section 48 information about the drive speed (rotation speed) of the PF motor 22 detected by inputting the output pulse output from an encoder (for example, a rotary encoder) (not shown) provided in the paper-sheet feeding mechanism when driving the PF motor 22. In addition, when stopping drive of the PF motor 22 which is being driven, the PF motor driving section 47 reads the stop time from the PF timer 50 and transmits information about the stop time to the control section 41.

The heat storage calculating units 44 and 48 are each formed of a CPU which calculates heat storage of the respective motors 15 and 22 with reference to a table (for example, a table shown in FIG. 3) stored in a predetermined storage area of a memory such as a ROM or a nonvolatile memory. The CR heat storage calculating section 44 calculates a drive period of time (that is, a period of time after the drive is started until the drive is stopped) necessary to perform the one-time printing process on the basis of the time clocked by the CR timer 46 when the CR motor 15 performs the printing process. When the PF motor 22 is driven, the PF heat storage calculating section 48 calculates a period of time (that is, a period of time during the drive of the PF motor 22) after the drive of the PF motor 22 is started until the drive thereof is stopped, on the basis of the time clocked by the PF timer 50.

The memories 45 and 49 each refer to a storage area for storing information which has not to be erased even in spite of power-off, and are each formed of a nonvolatile memory. The timers 46 and 50 are each formed of a counter which performs counting on the basis of a clock signal or the like from a clock circuit or a CPU which performs a program for a timer process. The timers 46 and 50 each serve as a clocking member capable of clocking time only when power is supplied from the AC source 60 to the control unit 40 (each of the timers 46 and 50) through the power source circuit 34.

Next, a table used when the CR motor driving section 43 calculates an amount of emitted heat on the basis of the drive of the CR motor 15 will be described with reference to FIG. 3.

Figures 3, 4:
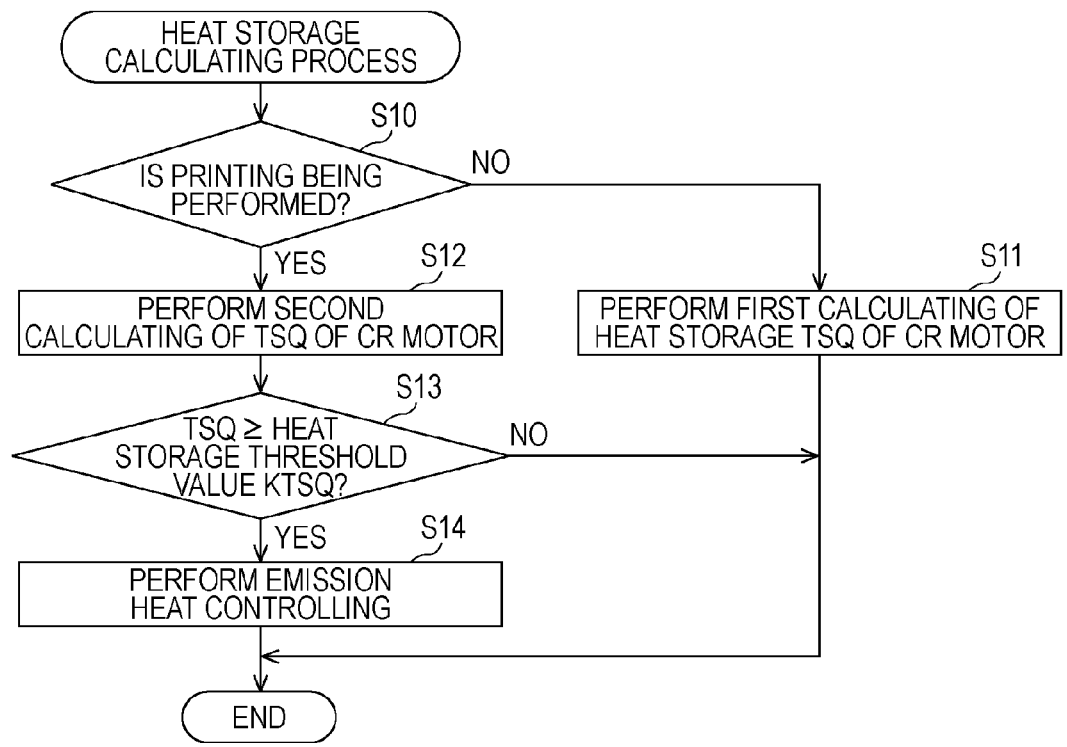
FIG. 3 is a diagram illustrating a table for detecting an amount of heat emitted by a CR motor using a relationship between a drive speed and drive time of the CR motor.
FIG. 4 is a diagram illustrating a flowchart for explaining a process of calculating heat storage according to the first embodiment.

The table shown in FIG. 3 is a table for estimating an amount of emitted heat $GQ_{nm}$ of the CR motor 15 in every printing process using a drive speed $V_n$ (where n is an integer of "zero" or more) of the CR motor 15 and a drive time $ST_m$ (where m is an integer of "zero" or more) of the CR motor 15. Specifically, from the table shown in FIG. 3, the CR heat storage calculating section 44 reads an amount of emitted heat $GQ_{10}$ of the CR motor 15, which is estimated using a drive speed $V_1$ transmitted when the one-time printing process of the carriage 14 ends and a drive time $ST_0$ calculated on the basis of the time clocked by the CR timer 46.

In this embodiment, a table corresponding to the PF motor 22 is also stored in a predetermined area of the ROM or the nonvolatile memory. In addition, from the table for the PF motor 22, the CR heat storage calculating section 44 reads an amount of emitted heat of the PF motor 22, which is estimated using a drive speed of the PF motor 22 transmitted when the drive of the PF motor 22 ends and drive time calculated on the basis of time clocked by the PF timer 50.

Figure 5:
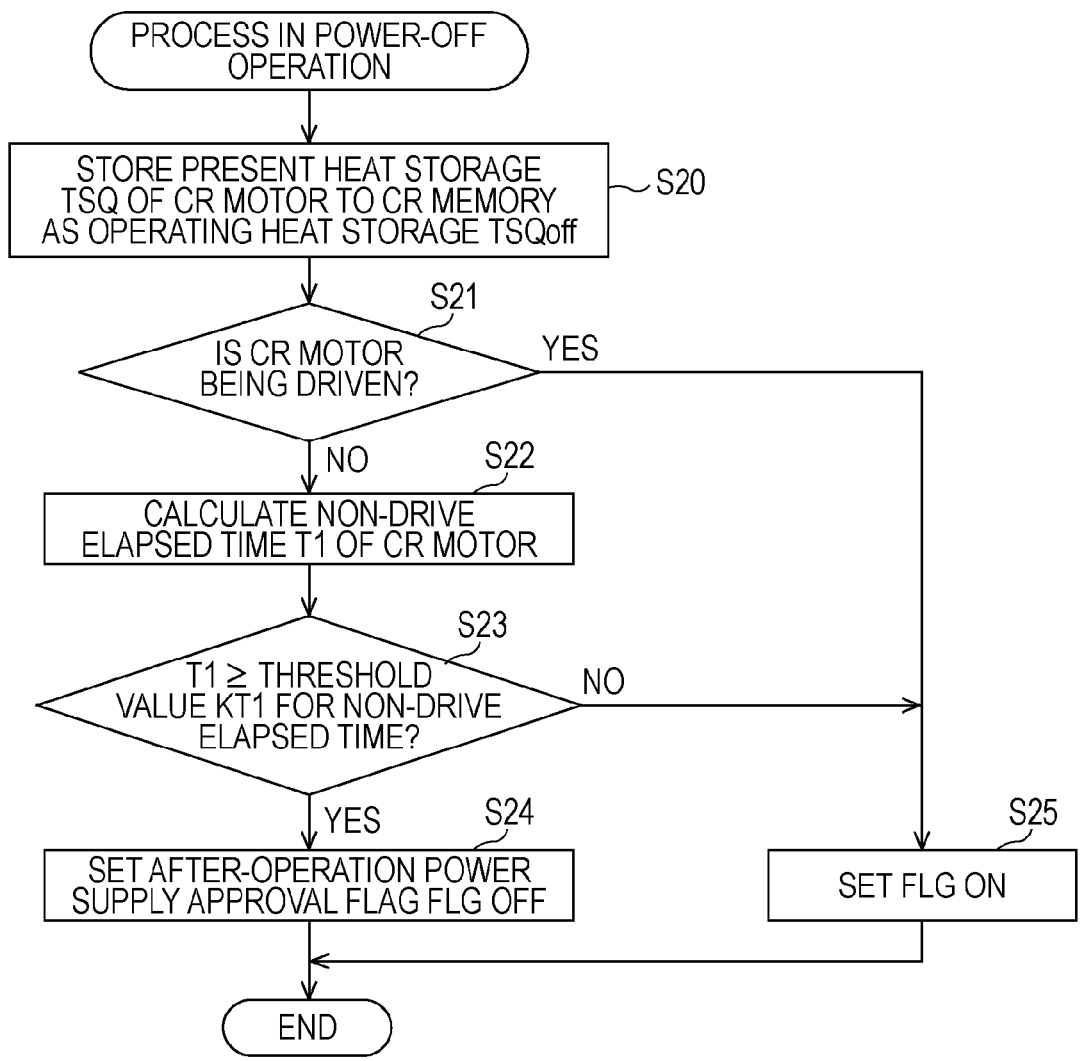
FIG. 5 is a diagram illustrating a flowchart for explaining a power-off operation according to the first embodiment.
Figure 6:
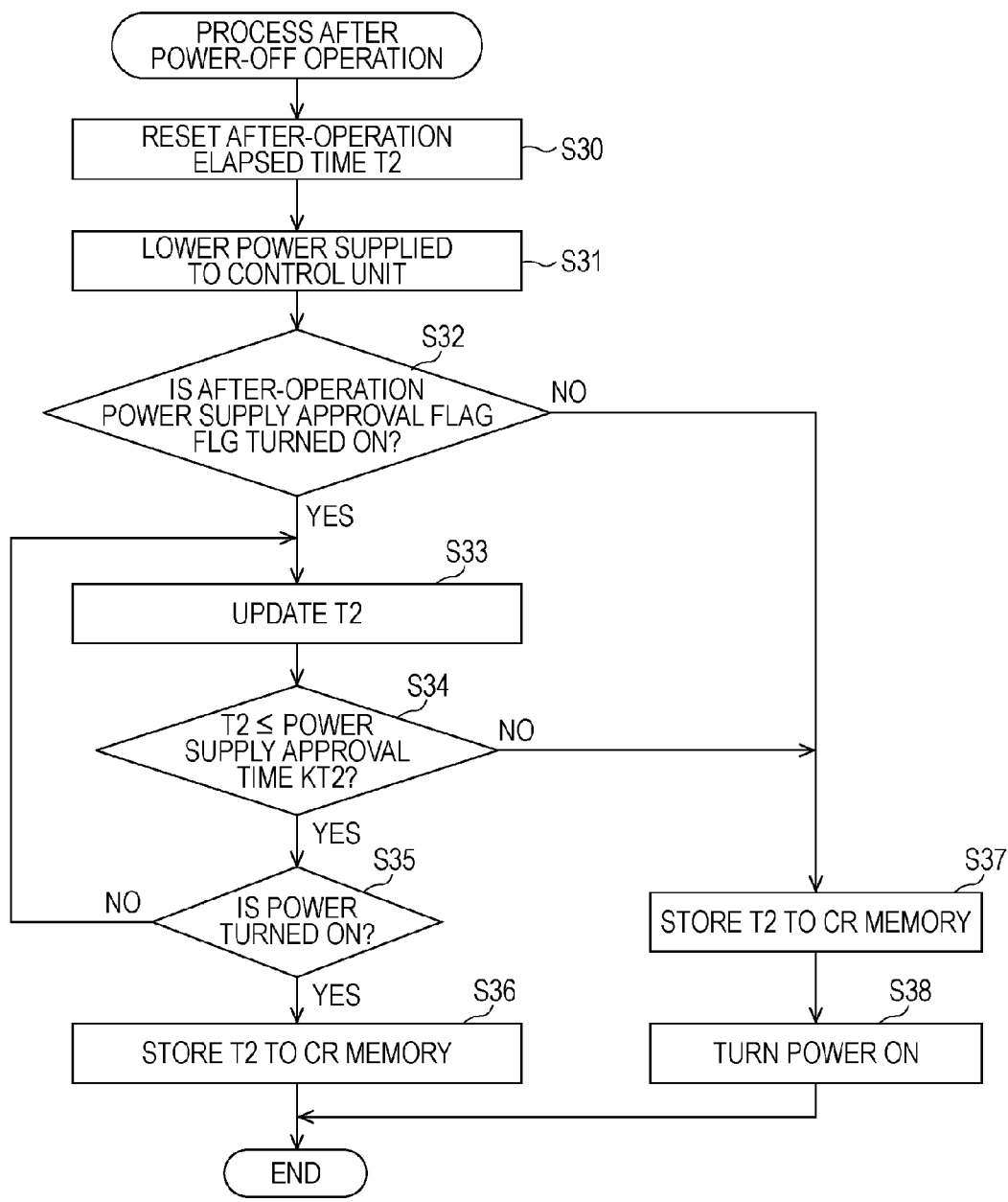
FIG. 6 is a diagram illustrating a flowchart for explaining a process performed after the power-off operation according to the first embodiment.
Figure 7:
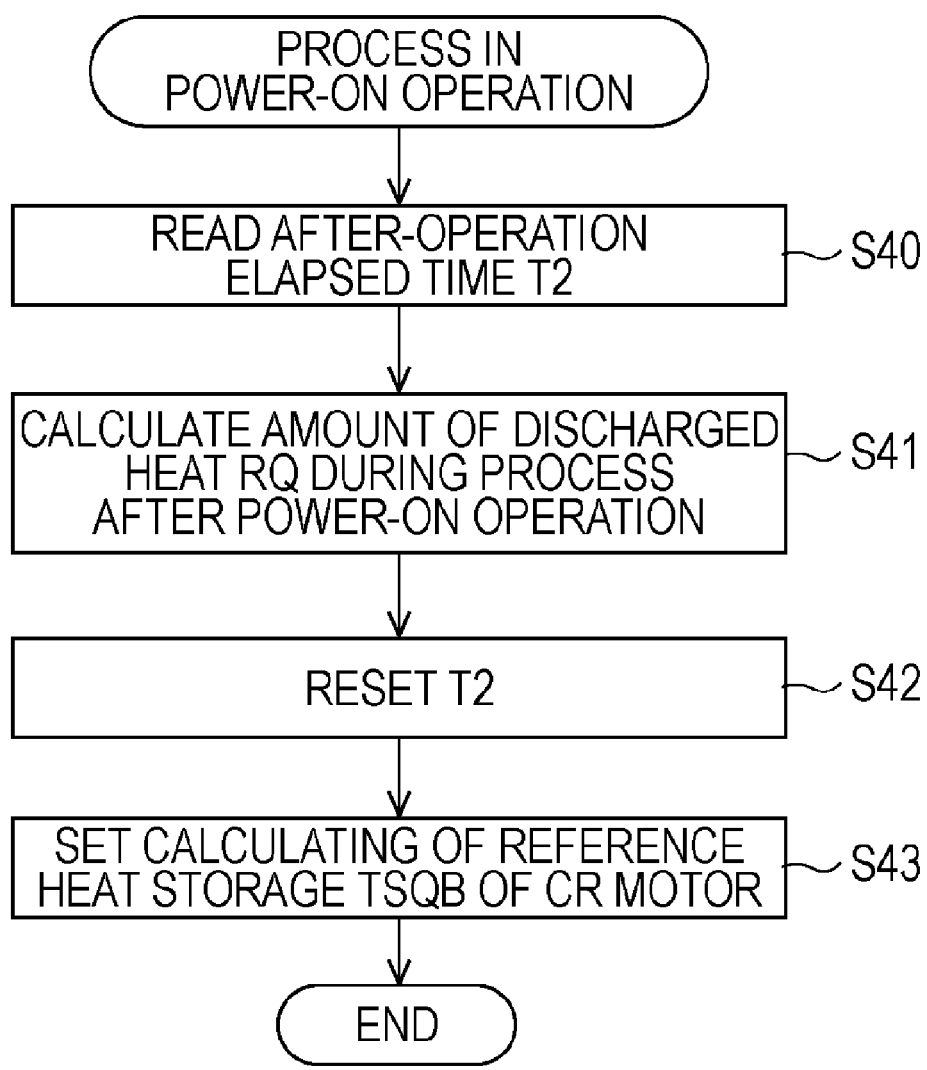
FIG. 7 is a diagram illustrating a flowchart for explaining a process at the time of performing a power-on operation according to the first embodiment.
Figure 8:
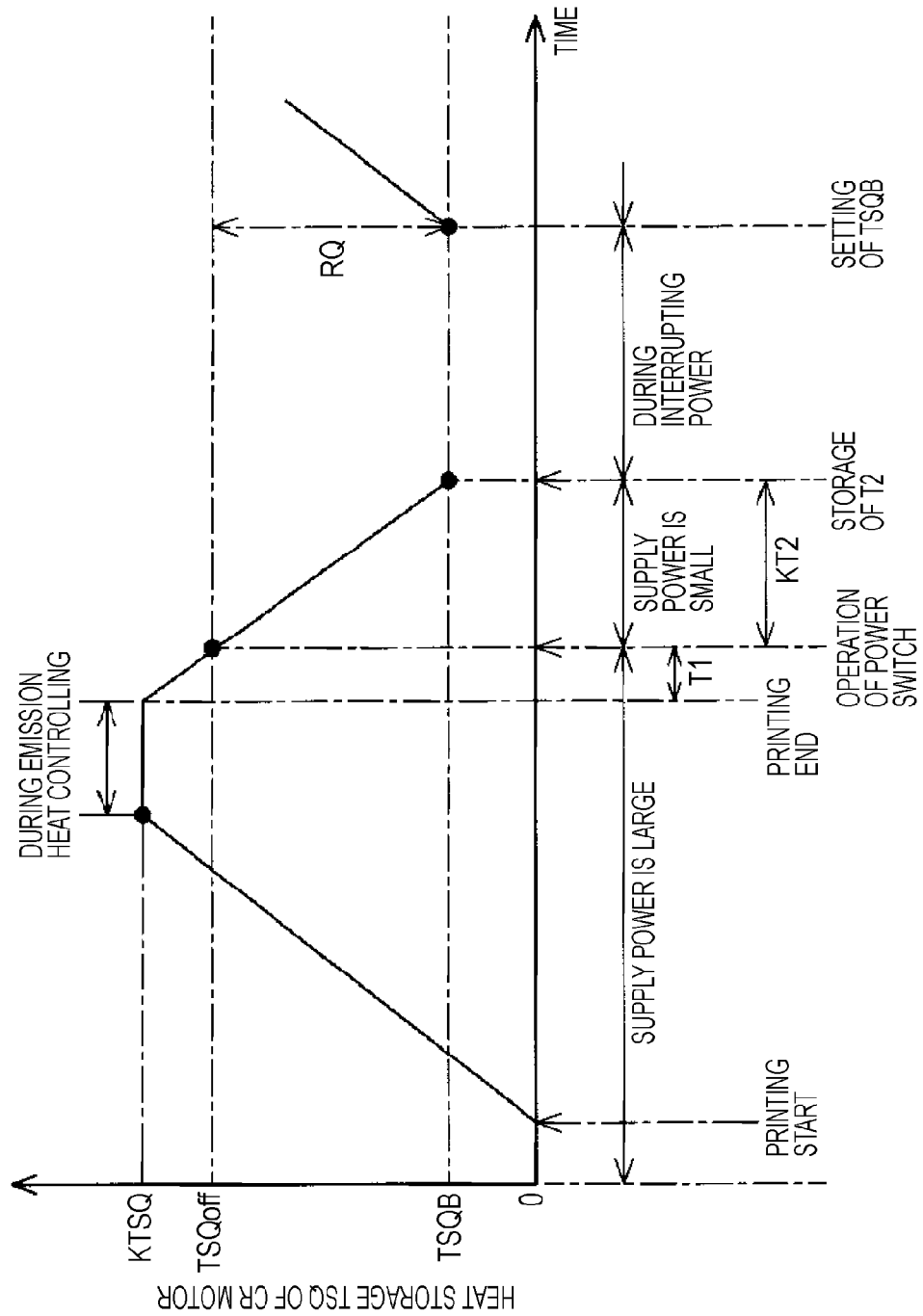
FIG. 8 is a diagram illustrating a timing chart for explaining variation in heat storage of a CR motor with time elapsed according to the first embodiment.

Next, operations performed by the control unit 40 according to this embodiment will be described with reference to flowcharts shown in FIGS. 4 to 7 and a timing chart shown in FIG. 8. The flowchart shown in FIG. 4 illustrates a heat storage calculating process performed every period when the carriage 14 is in a lock state in which it cannot be moved to the home position. The flowchart shown in FIG. 5 illustrates a process at the time of performing a power-off operation when the power switch 33 is operated to turn the power source off. The flowchart shown in FIG. 6 illustrates a process performed after the mentioned power-off operation is performed. The flowchart shown in FIG. 7 illustrates a process at the time of performing a power-on operation when the power switch 33 is operated to turn the power source on. The timing chart shown in FIG. 8 illustrates variation in heat storage TSQ of the CR motor 15 with time elapsed.

First, the heat storage calculating process will be described with reference to the flowchart shown in FIG. 4.

The control section 41 determines the carriage 14 to be locked at the home position and performs the heat storage calculating process when it detects on the basis of an output pulse output from the linear encoder 24 that the carriage 14 is positioned at the home position and it also detects on the basis of a signal from the CR current sensor 31 that the CR motor 15 is in a stop state. In addition, in the heat storage calculating process, the control section 41 determines whether printing is being performed (Step S10).

If the determination result is negative, the CR heat storage calculating section 44 performs first calculating of the heat storage TSQ of the CR motor 15 on the basis of a control command of the control section 41, and stores the heat storage TSQ to a predetermined area of the RAM (Step S11). Specifically, on the basis of time clocked by the CR timer 46, the CR heat storage calculating section 44 acquires an elapsed period of time (=a predetermined period) after the previous heat storage calculating process is performed, and calculates an amount of discharged heat of the CR motor 15 at the acquiring time. The amount of discharged heat has s correspondent relation with an elapsed period of time after drive of the CR motor 15 is stopped, and the amount of discharged heat becomes increased as the elapsed time is longer. Subsequently, the CR heat storage calculating section 44 acquires the heat storage TSQ of the CR motor 15 at this time by subtracting the amount of discharged heat from the heat storage TSQ stored in the predetermined area of the RAM when the previous heat storage calculating process has been performed, and then overwrites the heat storage TSQ to the predetermined area of the RAM. Then, the control section 41 terminates the heat storage calculating process.

Alternatively, if the determination result of Step S10 is affirmative, the CR heat storage calculating section 44 performs second calculating of the heat storage TSQ of the CR motor 15 on the basis of the control command of the control section 41, and then stores the heat storage TSQ to a predetermined area of the RAM (Step S12). Specifically, from the table shown in FIG. 3, the CR heat storage calculating section 44 reads the amount of emitted heat GQnm (for example, GQ34) of the CR motor 15, which is estimated using the drive speed Vn (for example, V3) transmitted when the one-time printing process of the carriage 14 ends and the drive time STm (for example ST4). Subsequently, the CR heat storage calculating section 44 acquires the heat storage TSQ of the CR motor 15 at this time by adding the amount of emitted heat GQnm to the heat storage TSQ stored in the predetermined area of the RAM when the previous heat storage calculating process has been performed, and then overwrites the heat storage TSQ to the predetermined area of the RAM. Accordingly, in this embodiment, the CR heat storage calculating section 44 serves as a heat storage calculating member. In addition, Steps S11 and S12 correspond to a heat storage calculating step.

Subsequently, the control section 41 determines whether the present heat storage TSQ of the CR motor 15 calculated by the CR heat storage calculating section 44 in Step S12 is equal to or larger than a preset heat storage threshold value KTSQ (Step S13). The heat storage threshold value KTSQ is a value used to determine whether to perform emission heat controlling described below in order to avoid an overheat state of the CR motor 15. In addition, the heat storage threshold value KTSQ is preset by an experiment or a simulation. If the determination result in Step S13 is negative (TSQ<KTSQ), the control section 41 terminates the heat storage calculating process.

Alternatively, if the determination result in Step S13 is affirmative (TSQ≧KTSQ), the CR motor driving section 43 performs heat storage increase controlling in order to suppress an increase in the heat storage TSQ of the CR motor 15 on the basis of a control command of the control section 41 (Step S14). In this embodiment, the CR motor driving section 43 performs emission heat controlling of controlling heat emitted from the CR motor 15 by stopping the drive of the CR motor 15 for a predetermined period of time (for example, 2 seconds) after the one-time printing process. Subsequently, the control section 41 terminates the heat storage calculating process. The emission heat controlling may be performed in a manner in which the drive speed Vn of the CR motor 15 is slowed in the printing, as long as the heat emitted from the CR motor 15 can be suppressed.

When the printing starts, as shown in FIG. 8, the heat storage TSQ of the CR motor 15 gradually increases with time elapsed in order to start the drive of the CR motor 15. In addition, when the heat storage TSQ of the CR motor 15 becomes equal to or larger than the heat storage threshold value KTSQ during the printing, the emission heat controlling of controlling the heat emitted from the CR motor 15 starts. Then, during the performance of the emission heat controlling, it is possible to suppress the increase in the heat storage TSQ of the CR motor 15 even though the printing is being performed. Then, when the printing ends, the amount of discharged heat of the CR motor 15 is larger than the amount of emitted heat of the CR motor 15. Accordingly, the heat storage TSQ of the CR motor 15 gradually decreases with time elapsed.

Next, a process at the time of performing the power-off process will be described with reference to the flowchart shown in FIG. 5.

The control section 41 starts to perform the process in the power-off operation when it detects that the power-off operation of the power switch 33 is performed during the power-on time. In the process in the power-off operation, the control section 41 reads the present heat storage TSQ of the CR motor 15, which has been stored in the predetermined area of the RAM in Steps S11 and S12 by the CR heat storage calculating section 44. Then, the control section 41 stores the heat storage TSQ as operating heat storage TSQoff to the CR memory 45

(Step S20). Accordingly, in this embodiment, the CR memory 45 serves as a storage member of the operating heat storage.

Subsequently, the control section 41 determines whether the CR motor 15 is being driven on the basis of information transmitted from the CR motor driving section 43 (Step S21). If the determination result is affirmative, the control section 41 proceeds with Step S25 described below. Alternatively, if the determination result in Step S21 is negative, the control section 41 reads time (hereinafter, referred to as "off time") clocked by the CR timer 46, and also calculates non-drive elapsed time T1, which is a period of time during the stop of the CR motor 15, using a difference between the stop time of the CR motor 15 and the power-off time (Step S22).

Subsequently, the control section 41 determines whether the non-drive elapsed time T1 calculated in Step S22 is equal to or larger than a preset threshold value KT1 (for example, 13 seconds) for the non-drive elapsed time (Step S23). If the determination result is negative (T1<KT1), the control section 41 proceeds with Step S25 described below. Alternatively, if the determination result in Step S23 is affirmative (T1≧KT1), the control section 41 performs an operation of setting whether to approve power supply after the power-off operation of the power switch 33, and sets an after-operation power supply approval flag FLG off (Step S24). Then, the process in the power-off operation ends. The threshold value KT1 of the non-drive elapsed time is set so as to be equal to a power supply approval time KT2 (see FIG. 6) described below.

In Step S25, the control section 41 sets the after-operation power supply approval flag FLG on. Then, the control section 41 terminates the process in the power-off operation.

Next, the process after the power-off operation will be described with reference to the flowchart shown in FIG. 6.

The control section 41 starts to perform the process after the power-off operation when the process in the power-off operation ends. In addition, in the process after the power-off operation, the control section 41 resets elapsed time T2 (hereinafter, referred to as "an after-operation elapsed time") after the power-off operation of the power switch 33 to "zero" (Step S30). Subsequently, the control section 41 controls the power source circuit 34 so as to more lower the power supplied to the control unit 40, comparing to the time before the power-off operation of the power switch 33 (Step S31). In Step S31, the control section 41 may control the power source circuit 34 to interrupt the power supply to the respective drivers 35, 36, and 37 and just to supply the power to the control unit 40.

Subsequently, the control section 41 determines whether the after-operation power supply approval flag FLG is in the on state (Step S32). If the determination result is negative (FLG=off), the control section 41 proceeds with Step S37 described below. Alternatively, if the determination result in Step S32 is affirmative (FLG=on) the control section 41 updates the after-operation elapsed time T2 on the basis of time clocked by the CR timer 46 (Step S33). Accordingly, in this embodiment, Step S33 corresponds to a clocking continuous step in which the CR timer 46 continues the clocking by maintaining the power supply to the CR timer 46 even after the power-off operation of the power switch 33. Subsequently, the control section 41 determines whether the after-operation elapsed time T2 is equal to or less than the power supply approval time KT2 (13 seconds in this embodiment) as a predetermined period of time set as the maximum time at the time of approving the power supply, even after the power-off operation of the power switch 33 (Step S34). The power supply approval time KT2 is preset so that the heat storage TSQ of the CR motor 15 after the power supply approval KT2 is elapsed becomes about 40% of the operating heat storage TSQoff of the CR motor 15, when the operating heat storage TSQoff is the heat storage threshold value KTSQ in the power-off operation of the power switch 33.

If the determination result in Step S34 is negative (T2>KT2), the control section 41 proceeds with Step S37 described below. Alternatively, if the determination result in Step S34 is affirmative (T2≦KT2), it is determined whether the power-on operation of the power switch 33 is performed (Step S35). If the determination result is negative, the control section 41 proceeds with Step S33 described above. Alternatively, if the determination result in Step S35 is affirmative, the control section 41 stores the after-operation elapsed time T2 updated on the basis of the time clocked by the CR timer 46 to a predetermined area of the CR memory 45 (Step S36), and then terminates the process in the power-off operation.

In Step S37, the control section 41 stores the after-operation elapsed time T2 updated on the basis of the time clocked by the CR timer 46 to a predetermined area of the CR memory 45. Subsequently, the control section 41 controls the power source circuit 34 to turn the power off (Step S38), and then terminates the process in the power-off operation. Accordingly, in this embodiment, the CR memory 45 also serves as a time storing member.

That is, in FIG. 8, when the power-off operation of the power switch 33 is performed during the stop of the CR motor 15, the heat storage TSQoff of the CR motor 15 at that time is stored in the CR memory 45. When the non-drive elapsed time T1 of the CR motor 15 is equal to or larger than the threshold value KT1 of the non-drive elapsed time, it is determined that the heat of the CR motor 15 is sufficiently discharged before the power-off operation of the power switch 33. Therefore, the power becomes off without the clocking of the CR timer 46 after the power-off operation. Alternatively, when the non-drive elapsed time T1 of the CR motor 15 is less than the threshold value KT1 of the non-drive elapsed time, the power-on state continues even in the power-off operation of the power switch 33. Afterward, when the power-on state continues so as to exceed the power supply approval time KT2, the after-operation elapsed time T2 (=KT2) after the power-off operation of the power switch 33 is stored in the CR memory 45. Alternatively, when the after-operation elapsed time T2 after the power-off operation of the power switch 33 is equal to or less than the power supply approval time KT2 and the power-on operation of the power switch 33 is performed, the after-operation elapsed time T2 (≠KT2) at that time is stored in the CR memory 45, and then a process in the power-on operation described below is performed.

Finally, the process in the power-on operation will be described with reference to the flowchart shown in FIG. 7.

The control section 41 performs the process in the power-on operation when it detects that the power-on operation of the power switch 33 is performed. In addition, in the process in the power-on operation, the control section 41 reads the after-operation elapsed time T2 stored in the CR memory 45 (Step S40). Subsequently, on the basis of the control command of the control section 41, the CR heat storage calculating section 44 calculates an amount of discharged heat RQ of the CR motor 15 during the process after the power-off operation (that is, a period of time until the after-operation elapsed time T2 is stored in the CR memory 45) (Step S41). Specifically, the CR heat storage calculating section 44 obtains an increase rate of the amount of discharged heat RQ of the CR motor 15 by multiplying the after-operation elapsed time T2 by a predetermined coefficient in that the increase rate of the amount of discharged heat RQ of the CR motor 15 is proportional to the after-operation elapsed time T2. In addition, the CR heat storage calculating section 44 obtains the amount of discharge heat RQ of the CR motor 15 by multiplying the operating heat storage TSQoff read from the CR memory 45 by the amount of discharged heat RQ.

The control section 41 resets the after-operation elapsed time T2 to "zero" and overwrites the after-operation elapsed time T2 (="zero") so as to be stored in a predetermined area of the CR memory 45 (Step S42). In addition, on the basis of the control command of the control section 41, the CR heat storage calculating section 44 reads the operating heat storage TSQoff from the CR memory 45 and decreases the amount of discharged heat RQ of the CR motor 15 obtained in Step S41 from the operating heat storage TSQoff. In addition, the CR heat storage calculating section 44 sets the decreased value to reference heat storage TSQB if the decreased value is larger than "zero". Alternatively, the CR heat storage calculating section 44 sets "zero" to the reference heat storage TSQB if the decreased value is less than "zero". Subsequently, the CR heat storage calculating section 44 stores the reference heat storage TSQB as an initial value of the heat storage TSQ of the CR motor 15 to the CR memory 45 (Step S43). The reference heat storage TSQB is overwritten in the predetermined area in which the operating heat storage TSQoff has been stored in the CR memory 45.

Subsequently, the control section 41 terminates the process in the power-on operation. Accordingly, in this embodiment, the CR heat storage calculating section 44 also serves as an initial value setting portion. In addition, Step S43 corresponds to an initial setting step. As shown in FIG. 8, the heat storage calculating process is performed to calculate the heat storage TSQ of the CR motor 15 during the drive of the printing apparatus 11 on the basis of the reference heat storage TSQB.

In the above-described embodiment, the reference heat storage TSQB of the CR motor 15 and the method of calculating the heat storage TSQ of the CR motor 15 on the basis of the reference heat storage TSQB have been described. However, the method of calculating the heat storage TSQ of the CR motor 15 may be embodied as a method of calculating heat storage of the PF motor 22.

That is, when the power-off operation of the power switch 33 is performed, the heat storage of the PF motor 22 at the time of operating the power switch 33 is stored as operating heat storage to the PF memory 49 by performing a control process corresponding to the process in the power-off operation. In this case, the PF memory 49 serves as a storage member for the operating heat storage. In addition, when the control process corresponding to the process in the power-off operation ends, a control process corresponding to the process after the power-off operation is performed to continue clocking of the PF timer 50. In this case, the PF timer 50 serves as a clocking member. Afterward, when the power supply is interrupted, after-operation elapsed time from the power-off operation of the power switch 33 to the power-off time is stored in the PF memory 49. In this case, the PF memory 49 serves as a time storing member.

When the power-on operation of the power switch 33 is performed, a control process corresponding to the process in the power-on operation is performed so that the PF heat storage calculating section 48 reads the operating heat storage stored in the PF memory 49 and the after-operation elapsed time and sets reference heat storage (an initial value of the heat storage of the PF motor 22) of the PF motor 22. In this case, the PF heat storage calculating section 48 also serves as the initial value setting portion. Afterward, when the control process corresponding the process in the power-on operation ends, a control process corresponding to the heat storage calculating process is performed so that the PF heat storage calculating section 48 calculates heat storage of the PF motor 22 on the basis of the reference heat storage. In this case, the PF heat storage calculating section 48 also serves as the heat storage calculating member.

When the non-drive elapsed time of the PF motor 22 in the power-off operation of the power switch 33 is equal to or larger than the threshold value for the non-drive elapsed time, the reference heat storage of the PF motor 22 at the power-on time is set as the operating heat storage of the PF motor 22 in the previous power-off operation of the power switch 33.

Accordingly, in this embodiment, the following advantages are obtained.

(1) The power supply to the CR timer (timer member) 46 continues until the power supply approval time (predetermined time) KT2 after the power-off is elapsed in spite of the power-off operation of the power switch (operation member) 33. Accordingly, the clocking of the CR timer 46 continues. In addition, the heat storage TSQ of the CR motor (electric motor) 15 at the actual power-off time is calculated on the basis of the time (the after-operation elapsed time T2) clocked by the CR timer 46 until an actually power-off state after the power-off operation of the power switch 33. The heat storage TSQ is set as an initial value (the reference heat storage TSQB) of the heat storage of the CR motor 15 in the next power-on operation of the power switch 33. Accordingly, in the actual power-on operation of the power switch 33, the heat storage TSQ of the CR motor 15 is calculated on the basis of the set reference heat storage TSQB. Therefore, it is possible to exactly set the reference heat storage TSQB of the CR motor 15 at the time of turning the power on, comparing to a known example in which the heat storage TSQ of the CR motor 15 in the power-off operation of the power switch 33 is set as reference heat storage.

(2) It is possible to calculate the amount of discharged heat RQ of the CR motor (electric motor) 15 after the power-off operation of the power switch 33 is performed until the power-on operation of the power switch (operation member) 33 is performed, on the basis of the time (after-operation elapsed time T2) clocked by the CR timer (timer member T2) 46 after the power-off operation of the power switch 33. Moreover, the CR timer 46 is a timer member which is driven only when the power is supplied. Accordingly, the power is supplied until the power supply approval time (predetermined time) KT2 is elapsed even in the power-off operation of the power switch 33. Therefore, it is possible to estimate the amount of discharged heat RQ of the CR motor 15 in the power-off operation of the power switch 33 even when the timer member such as RTC (Real Time Clock) is not provided.

(3) When the printing apparatus (electronic apparatus) 11 is connected to a host computer, the printing apparatus 11 receives time information (hereinafter, referred to as "off-time information") from the host computer at the time of turning the power off, and also receives time information (hereinafter, referred to as "on-time information") from the host computer at the time of turning the power on. In addition, it is possible to calculate a period of time when the power is turned off, using the received off-time information and on-time information, and calculate the amount of discharged heat RQ of the CR motor (electric motor) 15 during the power-off time after the period of time. However, if the time information received from the host computer is erroneous, the period of time during the power-off time calculated on the basis of the receive off-time information and on-time information is also erroneous. Therefore, the amount of discharge heat RQ of the CR motor 15 may be erroneously calculated. However, in this embodiment, since the time information received from the host computer is not used, it is possible to prevent the amount of discharged heat RQ of the CR motor 15 from being calculated erroneously.

(4) The power supply approval time (predetermined time) KT2 is set so that the heat storage TSQ (=the reference heat storage TSQB at the time of turning the power on) of the CR motor 15 after the power supply approval time KT2 becomes larger than "zero" when the operating heat storage TSQoff of the CR motor (electric motor) 15 at the time of turning the power switch (operation member) 33 off is equal to or larger than the heat storage threshold value KTSQ. Accordingly, it is possible to reduce power consumption of the printing apparatus (electronic apparatus) 11, comparing to a case in which the power supply approval time KT2 is set to a value in which the reference heat storage TSQB becomes "zero".

(5) When the power switch (operation member) 33 of the CR motor (electric motor) 15 is turned off, it is determined whether the non-drive elapsed time T1 after the drive of the CR motor 15 stops until the power-off operation of the power switch 33 is performed is equal to or larger than the threshold value KT1 of the non-drive elapsed time. In addition, when the non-drive elapsed time T1 is equal to or larger than the threshold value KT1 of the non-drive elapsed time, it is determined that the heat storage TSQ of the CR motor 15 becomes sufficiently lowered, and the power becomes turned off without maintenance of the power supply after the power-off operation of the power switch 33. In the power-on operation of the power switch 33, the operating heat storage TSQoff of the CR motor 15 in the power-off operation of the power switch 33 is set to the reference heat storage (initial value) TSQB. Therefore, when it is not necessary to supply the power after the power-off operation of the power switch 33, the power rapidly becomes off after the power-off operation of the power switch 33. Accordingly, it is possible to reduce power consumption of the printing apparatus (electronic apparatus) 11.

(6) In this embodiment, the clocking of the CR timer (timer member) 46 continues after the power switch (operation member) 33 is turned off until the power supply is maintained. However, the calculating of the heat storage TSQ (or the amount of discharged heat RQ) of the CR motor (electric motor) 15 is not performed. Accordingly, it is possible to more lower the power supplied to the control unit 40 after turning the power switch (operation member) 33 off, comparing to the case in which the heat storage TSQ (or the amount of discharged heat RQ) of the CR motor 15 is calculated.

(7) In a case in which Step S42 proceeds after Step S43 in the process in the power-on operation, the following problems may arise when the power supply is forcedly interrupted after the performance of Step S43 and before the performance of the Step S42. That is, in a case in which the power is again turned on after the forced interruption of the power supply, Step S42 is again performed after the performance of Step S43. Accordingly, the reference heat storage TSQB when finishing the process in the power-on operation is set to a value less than the actual heat storage at the power-on time as a result of performing Step S43 plural number of times. Therefore, when the heat storage of the CR motor 15 increases due to the drive of the CR motor 15 afterward, the emission heat controlling may not be performed in spite of the timing when the emission heat controlling (heat storage increase controlling) has to be performed originally. In this embodiment, Step S43 is not performed plural number of times before the performance of Step S42 even though the power supply is forcedly interrupted during the process in the power-on operation. Accordingly, it is possible to perform the emission heat controlling at an appropriate timing.

Second Embodiment

Figure 9:
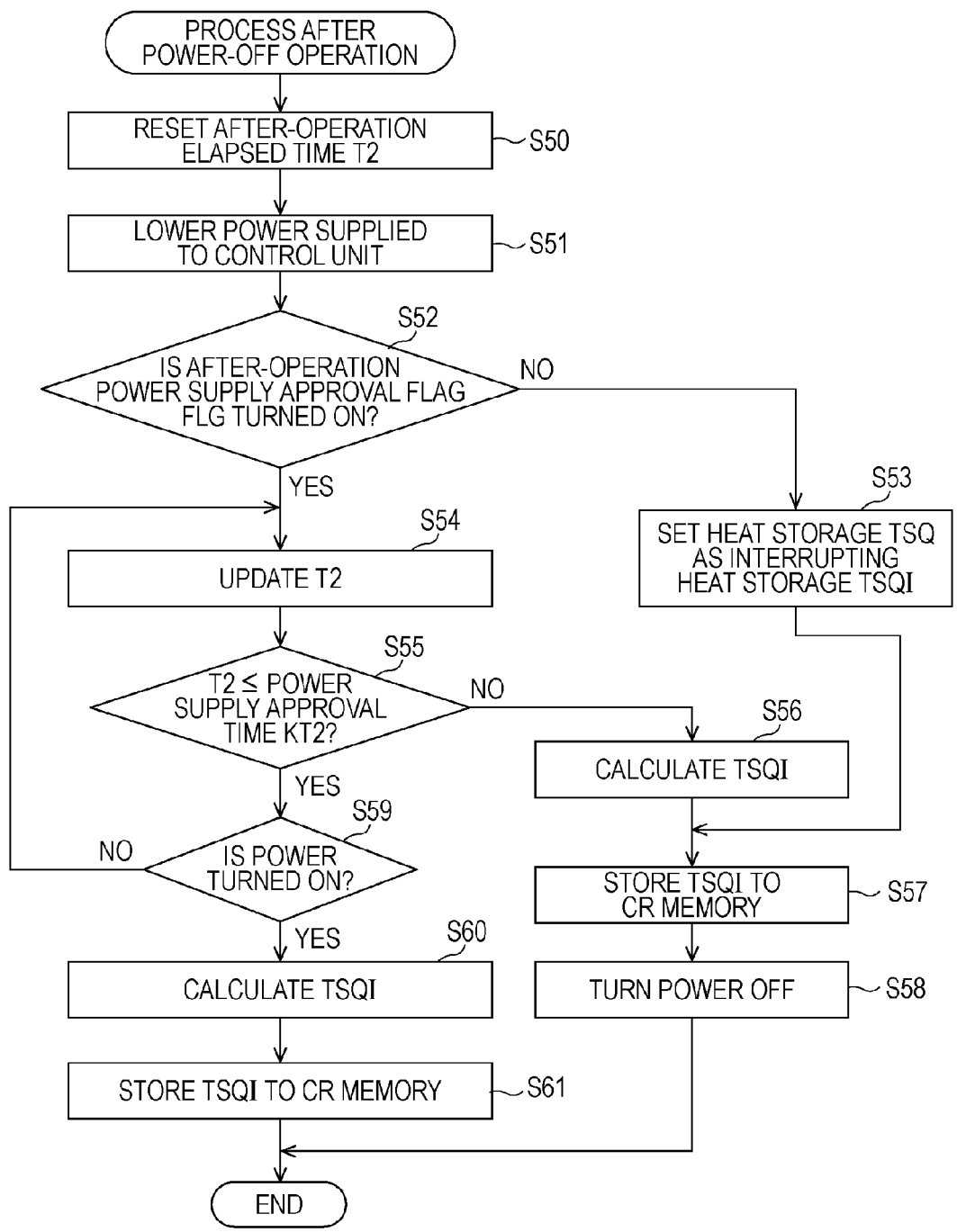
FIG. 9 is a diagram illustrating a flowchart for explaining a process performed after a power-off operation according to a second embodiment.
Figure 10:
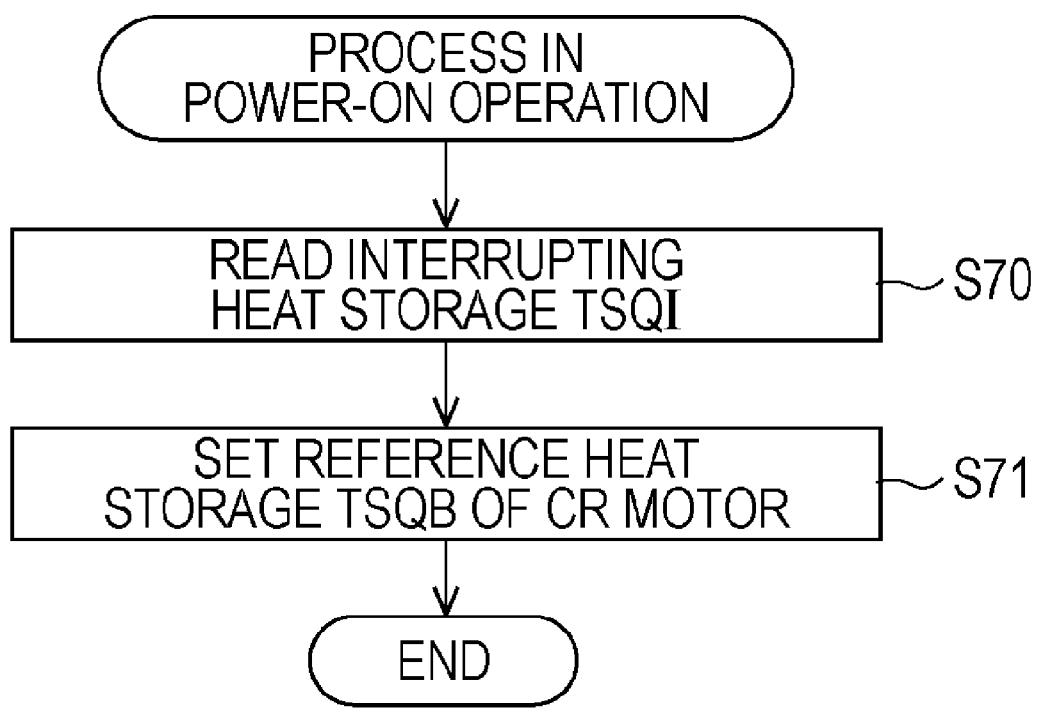
FIG. 10 is a diagram illustrating a flowchart for explaining a process at the time of performing a power-on operation according to the second embodiment.

Next, a second embodiment of the invention will be described with reference to FIGS. 9 to 11. There is a difference between the second embodiment and the first embodiment in the process after the power-off operation and the process in the power-on operation. Accordingly, the different details from those of the first embodiment will be mainly described below. The same reference numerals are given to the same elements as those of the first embodiment, and the same details are omitted.

First, a process after an power-off operation will be described with reference to a flowchart shown in FIG. 9.

The control section 41 starts to perform the process after the power-off operation when a process in the power-off operation ends. In addition, in the process after the power-off operation, the control section 41 sequentially performs Steps S50, S51, and S52 corresponding to Steps S30, S31, and S32 of the process after the power-off operation according to the first embodiment. If the determination result in Step S52 is negative (FLG=off), the CR heat storage calculating section 44 reads the present heat storage TSQ of the CR motor 15 from the RAM on the basis of a control command of the control section 41, and sets the heat storage TSQ as an interrupting heat storage TSQI (Step S53). Afterward, the control section 41 proceeds with Step S57 described below.

Alternatively, if the determination result in Step S52 is affirmative (FLG=on), the control section 41 sequentially performs Steps S54 and S55 corresponding to Steps S33 and S34 of the process after the power-off operation according to the first embodiment. Accordingly, in this embodiment, Step S54 corresponds to the clocking continuous step. In addition, if the determination result in Step S55 is negative (T2>KT2), the CR heat storage calculating section 44 calculates an amount of discharged heat RQ of the CR motor 15 after the power-off operation of the power switch 33 until the after-operation elapsed time T2 is elapsed, on the basis of the control command of the control section 41. In addition, the CR heat storage calculating section 44 reads the heat storage TSQ of the CR motor 15 in the power-off operation of the power switch 33 from the RAM and obtains the interrupting heat storage TSQI by subtracting the amount of discharged heat RQ from the heat storage TSQ (Step S56). Afterward, the control section 41 proceeds with Step S57 described below.

In Step S57, on the basis of the control command of the control section 41, the CR heat storage calculating section 44 stores the interrupting heat storage TSQI of the CR motor 15 calculated in Step S53 or S56 to the CR memory 45 (Step S57). Accordingly, in this embodiment, the CR memory 45 serves as an interrupting heat-storage storing unit. Subsequently, the control section 41 controls the power source circuit 34 to turn the power off (Step S58). Then, the process in the power-off operation ends.

Alternatively, if the determination result in Step S55 is affirmative (T2≦KT2), the control section 41 determines whether the on operation of the power switch 33 is performed (Step S59). If the determination result is negative, the control section 41 proceeds with the process of Step S54 described above. Alternatively, if the determination result in Step S59 is affirmative, the CR heat storage calculating section 44 performs the same process as that of Step S56 on the basis of the control command of the control section 41 to obtain the interrupting heat storage TSQI of the CR motor 15 (Step S60). Subsequently, on the basis of the control command of the control section 41, the CR heat storage calculating section 44 stores the interrupting heat storage TSQI calculated in Step S60 to the CR memory 45 (Step S61). Then, the process in the power-off operation ends.

Figure 11:
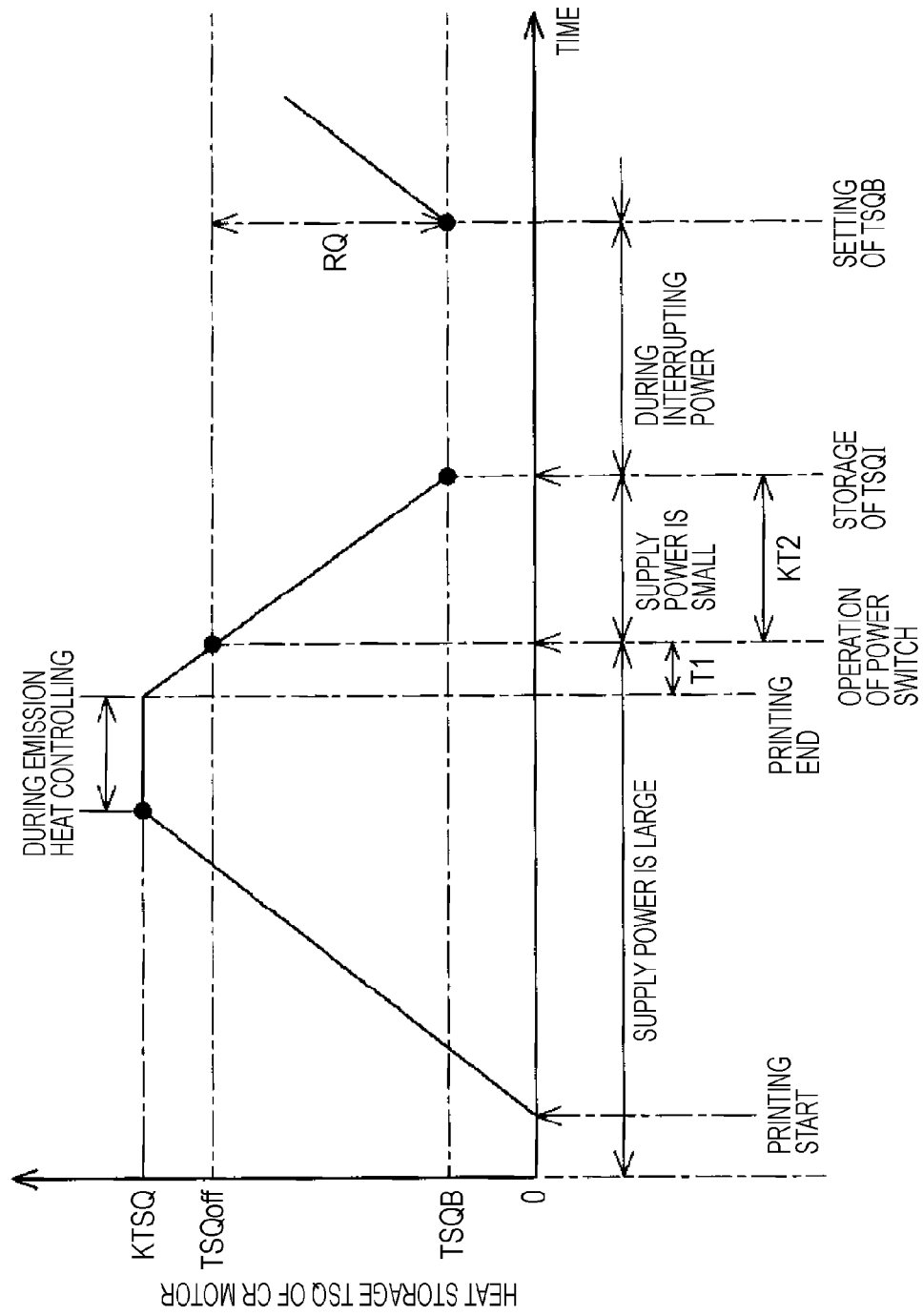
FIG. 11 is a diagram illustrating a timing chart for explaining variation in heat storage of a CR motor with time elapsed according to the second embodiment.

That is, in this embodiment, when the power-off operation of the power switch 33 is performed, as shown in FIG. 11, the interrupting heat storage TSQI of the CR motor 15 is calculated right before the power becomes off. In addition, the interrupting heat storage TSQI is stored in the CR memory 45.

Next, the process in the power-on operation will be described with reference to a flowchart shown in FIG. 10.

The control section 41 performs the process in the power-on operation when it detects that the power-on operation of the power switch 33 is performed. In addition, in the process in the power-on operation, the CR heat storage calculating section 44 reads the interrupting heat storage TSQI of the CR motor 15 from the CR memory 45 on the basis of the control command of the control section 41 (Step S70). Subsequently, the CR heat storage calculating section 44 sets the interrupting heat storage TSQI as reference heat storage TSQB of the CR motor 15 (Step S71). Accordingly, in this embodiment, Step S71 corresponds to the initial setting step. Then, the control section 41 terminates the process in the power-on operation.

In this embodiment, the method of calculating the reference heat storage TSQB of the CR motor 15 and the heat storage TSQ of the CR motor 15 on the basis of the reference heat storage TSQB has been described. However, the method of calculating the heat storage TSQ of the CR motor 15 may be embodied as a method of calculating the heat storage of PF motor 22. That is, when the power-off operation of the power switch 33 is performed, the heat storage of the PF motor 22 is calculated by the PF heat storage calculating section 48 right before the power becomes off and the heat storage as the interrupting heat storage is stored in the PF memory 49 by performing a control process corresponding to the process in the power-off operation when the PF motor 22 is interrupted. Accordingly, the PF memory 49 also serves as the interrupting heat-storage storing member.

When the power-on operation of the power switch 33 is performed, the PF heat storage calculating section 48 sets the interrupting heat storage of the PF motor 22 read from the PF memory 49 as the reference heat storage of the PF motor 22 by performing a control process corresponding to the process in the power-on operation. Afterward, when the control process corresponding to the process in the power-on operation ends, the PF heat storage calculating section 48 calculates the heat storage of the PF motor 22 on the basis of the reference heat storage by performing the control process corresponding to the heat storage calculating process.

Accordingly, in this embodiment, the following advantage can be obtained in addition to the advantages (1) to (5) according to the first embodiment.

(8) When the power-off operation of the power switch (operation member) 33 is performed, the heat storage TSQ of the CR motor (electric motor) 15 at the time of actually turning the power off is calculated, and the heat storage TSQ as the interrupting heat storage TSQI is stored in the CR memory (interrupting heat-storage storing member) 45. In addition, when the power-on operation of the power switch 33 is performed, the interrupting heat storage TSQI read from the CR memory 45 is set as the reference heat storage (initial value) TSQB of the CR motor 15. Therefore, it is possible to reduce control load right after the power becomes on as much as the heat storage (interrupting heat storage TSQI) of the CR motor 15 at the previous time of turning the power off is not calculated in the process in the power-on operation, comparing to the case according to the first embodiment.

The above-described embodiments may be modified in other forms.

In the above-described embodiments, Steps S21, S22, S23, and S24 in the process in the power-off operation may not be performed. That is, when the power-off operation of the power switch 33 is performed, the after-operation power supply approval flag may be set to without depending on the drive of the CR motor 15 right before the power-off operation of the power switch 33.

In the above-described embodiments, in a case in which the operating heat storage TSQoff of the CR motor 15 in the power-off operation of the power switch 33 is equal to or larger than the heat storage threshold value KTSQ, the power supply approval time KT2 may be set to any value as long as the heat storage TSQ of the CR motor 15 after pass of the power supply approval time KT2 becomes larger than "zero".

In the second embodiment, in the process after power-off operation, the heat storage TSQ of the CR motor 15 may be calculated between Steps S54 and S55. In addition, in a case in which the calculated heat storage TSQ of the CR motor 15 becomes "zero", Steps S56, S57, and S58 may be performed even though the determination result in Step S55 is affirmative. With such a configuration, in a case in which the heat storage TSQ of the CR motor 15 in the power-off operation of the power switch 33 is relatively low, performance time in the process after the power-off operation becomes shorter. Accordingly, it is possible to reduce power consumption that much.

In the above-described embodiments, the power supply approval time KT2 may be set shorter as the non-drive elapsed time T1 of the CR motor 15 in the power-off operation of the power switch 33 is longer. For example, a table indicating a relation between the non-drive elapsed time T1 and the power supply approval time KT2 of the CR motor 15 is configured to be stored in the ROM (or the nonvolatile memory) of the control unit 40. In this case, from the ROM (or the nonvolatile memory), the control section 41 reads the power supply approval time KT2 corresponding to the non-drive elapsed time T1 detected at the time of performing the process in the power-off operation. With such a configuration, when the non-drive elapsed time T1 is long, it is determined that the heat storage TSQ of the CR motor 15 is smaller, comparing to the case in which the non-drive elapsed time T1 is short. Accordingly, the power supply approval time KT2 is set shorter. For this reason, when the non-drive elapsed time T1 is long, it is possible to reduce the power consumption of the printing apparatus 11, comparing to the case in which the non-drive elapsed time T1 is short.

In the above-described embodiments, the power supply approval time KT2 may be set shorter as the operating heat storage TSQoff of the CR motor 15 in the power-off operation of the power switch 33 becomes increased. For example, a table indicating a relation between the operating heat storage TSQoff and the power supply approval time KT2 of the CR motor 15 is configured to be stored in the ROM (or the nonvolatile memory) of the control unit 40. In this case, from the ROM (or the nonvolatile memory), the control section 41 reads the power supply approval time KT2 corresponding to the operating heat storage TSQoff detected at the time of performing the process in the power-off operation. With such a configuration, when the operating heat storage TSQoff of the CR motor 15 is large, the power supply approval time KT2 is set shorter. For this reason, when the operating heat storage TSQoff is large, it is possible to reduce the power consumption of the printing apparatus 11, comparing to the case in which the operating heat storage TSQoff is small.

In the first embodiment, Step S20 in the process of the power-off operation may not be performed. In this case, it is desirable that the heat storage TSQ of the CR motor 15 in Step S11 or S12 in the heat storage calculating process is stored in the nonvolatile memory. In addition, when the process of the power-on operation is performed, the newest heat storage TSQ among the heat storages TSQ stored in the nonvolatile memory may be read as the operating heat storage. Even with such a configuration, it is possible to obtain the same advantage as that according to the first embodiment.

In the above-described embodiments, a table indicating a relation between the after-operation elapsed time T2 and the amount of discharged heat RQ of the CR motor 15 may be stored in the ROM (or the nonvolatile memory) of the control unit 40. In addition, when the amount of discharged heat RQ of the CR motor 15 is estimated, the amount of discharged heat RQ corresponding to the after-operation elapsed time T2 may be read from the table.

In the above-described embodiments, the heat storage increase controlling may not be performed by intermittently stopping the drive of the CR motor 15, but may be performed by forcedly stopping the printing. In this case, when the heat storage TSQ of the CR motor 15 becomes less than a threshold value configured so as to be a half of the heat storage threshold value KTSQ, it is desirable to resume the printing. In addition, a fan for cooling the CR motor 15 may be provided in the printing apparatus 11, and when the heat storage increase controlling is performed, the fan may be configured to be driven without stopping the drive of the CR motor 15.

In the above-described embodiments, the printing apparatus 11 may be embodied in a so-called full-line type printer including the printing head 17 configured to have a shape corresponding to the length in a widthwise direction (right and left directions) of the paper sheet 19 in a direction intersecting a transport direction of the paper sheet 19. In this case, when the power switch 33 is turned on, reference heat storage of the PF motor 22 for transporting the paper sheet 19 is set on the basis of the after-operation elapsed time T2 after the power switch 33 is turned off until the power actually becomes off.

The printing apparatus 11 may be embodied not only in a dot impact type printer, but also in a laser type printer.

In the above-described embodiments, the electronic apparatus may be embodied in any electronic apparatus (for example, a scanner) which includes the electric motor.

What is claimed is:

1. An electronic apparatus comprising:
   an electric motor;
   an operation member that performs a power-off operation of interrupting power supply from a power source and a power-on operation of starting the power supply;
   a timer member that clocks time on the basis of the power supplied from the power source;
   a power supply member that supplies the power to the electric motor and the timer member from the power source and interrupts the power supply thereto;
   a heat storage calculating member that calculates heat storage of the electric motor during drive of the electric motor and calculates heat storage of the electric motor after stop of the drive on the basis of the time clocked by the timer member; and
   a controller that controls the electric motor and controls the power supply member so as to start the power supply on the basis of the power-on operation of the operation member and interrupt the power supply on the basis of the power-off operation of the operation member,
   wherein the controller controls the power supply member so as to maintain the power supply to at least the timer member of the timer member and the heat storage calculating member during a predetermined time even after the power-off operation of the operation member, and
   wherein the heat storage calculating member has an initial value setting portion that sets the heat storage on the basis of time clocked by the timer member after the power-off operation as an initial value of the heat storage of the electric motor in the next power-on operation of the operation member.

2. The electronic apparatus according to claim 1, wherein the controller performs heat storage increase controlling of controlling an increase in the heat storage of the electric motor when the heat storage of the electric motor calculated by the heat storage calculating member becomes equal to or larger than a preset heat storage threshold value, and
   wherein the predetermined time is preset so that the initial value of the heat storage of the electric motor which can be set by the initial value setting portion becomes larger than "zero" when the heat storage of the electric motor calculated by the heat storage calculating member in the power-off operation of the operation member becomes equal to or larger than the heat storage threshold value.

3. The electronic apparatus according to claim 1, wherein the controller sets the predetermined time shorter as the heat storage of the electric motor calculated by the heat storage calculating member in the power-off operation of the operation member is smaller.

4. The electronic apparatus according to claim 1, wherein the controller sets the predetermined time shorter as non-drive elapsed time after the electric motor in a drive state becomes a non-drive state until the operation member performs the power-off operation is longer in a case in which the operation member performs the power-off operation in the non-drive state of the electric motor.

5. The electronic apparatus according to claim 1, further comprising an operating heat-storage storing member that stores as operating heat storage the heat storage of the electric motor calculated by the heat storage calculating member in the power-off operation of the operation member,
   wherein the controller controls the power supply member so as to interrupt the power supply from the power source when the non-drive elapsed time after the electric motor in the drive state becomes the non-drive state until the operation member performs the power-off operation becomes equal to or larger than a preset threshold value of the non-drive elapsed time in the case in which the operation member performs the power-off operation in the non-drive state of the electric motor, and
   wherein the initial value setting portion sets the operating heat storage stored in the operating heat-storage storing member as an initial value of the heat storage of the electric motor in the next power-on operation of the operation member.

6. The electronic apparatus according to claim 1, further comprising:
   an operating heat-storage storing member that stores as operating heat storage the heat storage of the electric motor calculated by the heat storage calculating member in the power-off operation of the operation member; and
   a time storing member that stores as after-operation elapsed time elapsed time after the operation member performs the power-off operation until the power supply is interrupted, wherein in the power-on operation of the operation member, the initial value setting portion obtains an amount of discharged heat of the electric motor in the after-operation elapsed time stored in the time storing member, and sets an initial value of the heat storage of the electric motor on the basis of the obtained amount of discharged heat of the electric motor and the operating heat storage stored in the operating heat-storage storing member.

7. The electronic apparatus according to claim 1, further comprising an interrupting heat-storage storing member that stores the heat storage of the electric motor calculated by the heat storage calculating member as interrupting heat storage when the power supply is interrupted after the power-off operation of the operation member, wherein the heat storage calculating member is configured so as to calculate the heat storage of the electric motor during maintenance of the power supply after the power-off operation of the operation member, and wherein the initial value setting portion sets the interrupting heat storage stored in the interrupting heat-storage storing member as an initial value of the heat storage of the electric motor in the next power-on operation of the operation member.

8. A method of controlling an electric motor mounted in an electronic apparatus including the electric motor, an operation member that performs a power-off operation of interrupting power supply from a power source and a power-on operation of starting the power supply, and a timer member that clocks time on the basis of the power supplied from the power source, the method comprising:

calculating heat storage of the electric motor during drive of the electric motor and calculating heat storage of the electric motor after stop of the drive on the basis of the time clocked by the timer member;

continuing clocking of the timer member by maintaining the power supply to the timer member during a predetermined time even after the power-off operation of the operation member; and setting heat storage on the basis of time clocked by the timer member after the power-off operation in the continuing the clocking as an initial value in the next power-on operation of the operation member.

* * * * *